United States Patent
Gavazzi et al.

(10) Patent No.: US 10,302,164 B2
(45) Date of Patent: May 28, 2019

(54) MATERIAL FOR FRICTION COMPONENTS OF DISC BRAKES

(75) Inventors: Andrea Gavazzi, Bergamo (IT); Lorenzo Cavalli, Bergamo (IT); Massimiliano Valle, Bergamo (IT)

(73) Assignee: FRENI BREMBO S.p.A., Bergamo (IT)

( * ) Notice: Subject to any disclaimer, the term of this patent is extended or adjusted under 35 U.S.C. 154(b) by 689 days.

(21) Appl. No.: 14/359,323

(22) PCT Filed: Nov. 21, 2011

(86) PCT No.: PCT/IT2011/000381
§ 371 (c)(1),
(2), (4) Date: Sep. 25, 2014

(87) PCT Pub. No.: WO2013/076744
PCT Pub. Date: May 30, 2013

(65) Prior Publication Data
US 2015/0047930 A1    Feb. 19, 2015

(51) Int. Cl.
| | | |
|---|---|---|
| *F16D 69/02* | (2006.01) | |
| *C08L 61/06* | (2006.01) | |
| *C08L 83/04* | (2006.01) | |
| *C08K 3/08* | (2006.01) | |
| *C08L 61/00* | (2006.01) | |
| *F16D 65/092* | (2006.01) | |

(52) U.S. Cl.
CPC ............. *F16D 69/025* (2013.01); *C08K 3/08* (2013.01); *C08L 61/00* (2013.01); *C08L 61/06* (2013.01); *C08L 83/04* (2013.01); *F16D 69/023* (2013.01); *F16D 65/092* (2013.01); *F16D 2200/0043* (2013.01); *F16D 2200/0056* (2013.01)

(58) Field of Classification Search
CPC .... F16D 65/092; F16D 69/023; F16D 69/025; C08L 61/06; C08L 83/04
See application file for complete search history.

(56) References Cited

U.S. PATENT DOCUMENTS

| | | | | | |
|---|---|---|---|---|---|
| 3,210,303 A | * | 10/1965 | Biggs | ...................... | F16D 69/02 |
| | | | | | 188/251 M |
| 5,512,351 A | * | 4/1996 | Miyamichi | ............... | B32B 5/26 |
| | | | | | 427/228 |
| 5,753,356 A | * | 5/1998 | Lam | ........................ | C04B 30/02 |
| | | | | | 427/386 |

(Continued)

FOREIGN PATENT DOCUMENTS

| | | |
|---|---|---|
| CN | 1187836 | 7/1998 |
| FR | 2930254 | 10/2009 |

(Continued)

OTHER PUBLICATIONS

Machine translation of FR 2930254, generated Nov. 13, 2016.*
International Search Report and Written Opinion dated Jul. 18, 2012.

*Primary Examiner* — Bradley T King
(74) *Attorney, Agent, or Firm* — Merchant & Gould P.C.

(57) ABSTRACT

The invention illustrates a material for friction components of disc brakes comprising between 1% and 8% by weight of at least one preceramic resin and between 2% and 10% by weight of at least one organic resin. It also illustrates a friction component for a disc brake, a disc brake, and a process for producing such a material.

19 Claims, 3 Drawing Sheets

(56) References Cited

U.S. PATENT DOCUMENTS

| | | | | |
|---|---|---|---|---|
| 5,817,411 A | * | 10/1998 | Nakajima | F16D 69/026 428/334 |
| 6,446,767 B1 | * | 9/2002 | Gonzalez | F16D 65/14 188/71.6 |
| 2004/0143081 A1 | * | 7/2004 | Oikawa | C07F 7/21 528/10 |
| 2005/0075414 A1 | * | 4/2005 | Lam | F16D 69/026 523/149 |
| 2006/0024416 A1 | | 11/2006 | Huang | |

FOREIGN PATENT DOCUMENTS

| | | | | |
|---|---|---|---|---|
| JP | 6028484 | | 11/2016 | |
| WO | WO-2010015897 A1 | * | 2/2010 | C04B 35/571 |

* cited by examiner

MATERIAL FOR FRICTION COMPONENTS OF DISC BRAKES

CROSS-REFERENCE TO RELATED APPLICATION

This application is the 35 U.S.C. § 371 national stage of PCT Application No. PCT/IT2011/000381, entitled "Material for Friction Components of Disc Brakes" and filed Nov. 21, 2011, which is herein incorporated by reference in its entirety.

The present invention relates to a material for friction components of disc brakes.

The present invention relates also to a process for producing a material for friction components of disc brakes, pads for disc brakes and disc brakes comprising such pads.

In general, in a disc brake, the braking action is produced by braking means, like for example a piston and cylinder group, which act through friction components on opposite surfaces of a rotating disc.

It is known to carry out friction components for disc brakes using conventional organic materials such as phenolic resins.

Such materials, however, have strict limitations, in terms of resistance to temperature, which means that components of substantial dimensions have to be made, with obvious drawbacks in the field of reference.

Therefore, recently friction components for disc brakes have been made using ceramic matrix materials.

Indeed, ceramic matrix materials present good performance in terms of friction coefficient and of resistance to wear. Moreover, their characteristics of thermal refractoriness make it possible to reduce the transmission of heat from the disc to the hydraulic braking system, with respect to friction material obtained, for example, by sintering metallic or organic powders.

Such ceramic matrix materials are generally obtained through pyrolysis of polymeric ceramic precursors (polymer pyrolysis), normally consisting of siliconic organic polymers (containing silicon), like for example polysilanes, polycarbosilanes, polysilazanes and polysiloxanes.

The international patent application, in the name of the same Applicant, published at No. WO 2010/016079, describes an example of friction material with ceramic matrix.

It discloses a process for making a ceramic matrix material for friction components of brakes, in particular of disc brakes, comprising the following operational phases:
  preparing a mixture of at least one silicon type ceramic precursor, with particles of hard materials suitable as abrasives, particles of substances suitable as lubricants and particles of metallic materials;
  hot-press said mixture to obtain a green body;
  submitting said green body to a pyrolysis process in order to achieve ceramization of the preceramic binder, obtaining said ceramic matrix material;
  in which said mixture comprises a catalyst suitable for favouring reticulation of said ceramic precursor during said hot-pressing phase and in which said pyrolysis process is carried out at temperatures below 800° C.

Known ceramic materials, although they are efficient from the point of view of thermal resistance and therefore of braking, create vibrations and problems of noisiness during use. This greatly compromises its use since comfort is one of the most significant commercial requirements in the field of reference.

Indeed, it is known that, during the braking action, a noise is often generated, which is typically in the form of a whistle, which reduces driving comfort.

The generation of this kind of noise is attributed to the occurrence of vibration phenomena that involve different components of the brake, including the pads.

A great deal of researches has been carried out in order to propose disc brake geometries that make it possible to reduce or eliminate the noisiness of braking.

The solutions found, however, in most cases, require a redesign of the whole structure of the brake.

The need to so deeply modify the structure of the brake to reduce the phenomenon of whistling represents a substantial drawback. Indeed, given the complexity of the phenomena that occur during braking and given their dependency on the particular application, in other words the type of vehicle in which the disc brakes are used, a specific solution that is optimal based on theoretical simulations can be unsatisfactory following experimental tests or following its use for applications which differs from those foreseen.

The object of the present invention is therefore to provide a material for friction components of disc brakes that is resistant to high temperatures and that achieves effective and noiseless braking, even in small-sized components.

A further object of the present invention is to provide a friction component which does not involve structural modifications of the disc brake.

These and further objects are achieved through a material for friction components of disc brakes comprising between 1% and 8% by weight of at least one preceramic resin and between 2% and 10% by weight of at least one organic resin.

In the present context the term "preceramic" indicates a polymeric precursor of a ceramic material.

Thanks to the presence of such specific percentages of preceramic resin and organic resin in the composition of the material, it is possible to avoid the aforementioned drawbacks.

Preferably, the total amount of preceramic resin and organic resin is less than or equal to 12% in peso.

In this way the moulding step of the material is promoted.

In accordance with a preferred embodiment of the invention, said material for friction components comprises between 2% and 6% by weight of preceramic resin and between 4% and 8% by weight of organic resin.

With such percentages it is possible, apart from overcoming the drawbacks related to noisiness and heat resistance, also to improve performance in the running-in step of the friction components obtained with such materials.

In accordance with a particularly preferred embodiment of the invention, said material comprises 2% by weight of preceramic resin and 7% by weight of organic resin.

With such percentages, a material is obtained which presents a better compromise in terms of heat resistance and quietness of braking.

Advantageously, said preceramic resin comprises at least one silicone resin.

Preferably, the silicone resin is a siloxane resin. It is particularly cost-effective.

Even more preferably, said siloxane resin is a polysilsesquioxane resin. It is optimal for performance and wearing of the friction material obtained therewith.

Advantageously, the organic resin is a phenolic resin.

Preferably, the material for friction components also comprises at least one from: catalyst, abrasive agent, lubricant, metal and damping agent. They help the tribological functions.

In accordance with a further aspect, the invention concerns a friction component for disc brakes comprising a material as described before and as described better hereafter.

A friction component made from such a material achieves the same advantages of efficiency and quietness mentioned before.

It also has the advantage of having a conventional structure, i.e. of not requiring structural modifications of the disc brake.

In accordance with a further aspect, the invention concerns a disc brake comprising at least two pads, as described before and as better described hereafter, and a caliper for a disc brake comprising thrusting means suitable for clamping said at least two pads against a brake band of a brake disc.

Such a disc brake is simple and cost-effective to produce, as well as having all of the aforementioned advantages of efficiency and quietness.

In accordance with a further aspect, the invention relates to a process for producing a material for friction components of disc brakes comprising the following steps:
  providing between 1% and 8% by weight of at least one preceramic resin;
  providing between 2% and 10% by weight of at least one organic resin;
  mixing the preceramic resin and the organic resin;
  moulding and polymerising the mixture so as to obtain a semifinished product;
  firing the semifinished product.

Such a process makes it possible to produce a material with good heat resistance and therefore a friction component that is efficient, noiseless and small in size.

Such a method is also simple and cost-effective.

Baking is a known heat treatment that will not be detailed any further.

In order to better understand the invention and appreciate the advantages thereof, it will be hereafter provided a description of some non-limiting example embodiments of the material for friction components of disc brakes, of friction components for disc brakes, of disc brakes and of processes for producing the material for friction components for disc brakes, with reference to the attached figures, in which:

FIG. 1 represents a diagram showing two functions: the top part shows the progression of the average friction coefficient of a friction component in a material according to a first embodiment of the present invention, in a known organic material and in a known ceramic material, as far as the number of braking episodes increases, in normal operation; the bottom part shows the progression of the temperature of the disc, associated with the friction component during braking, as far as the number of braking episodes increases for the same three materials;

Figure 1:
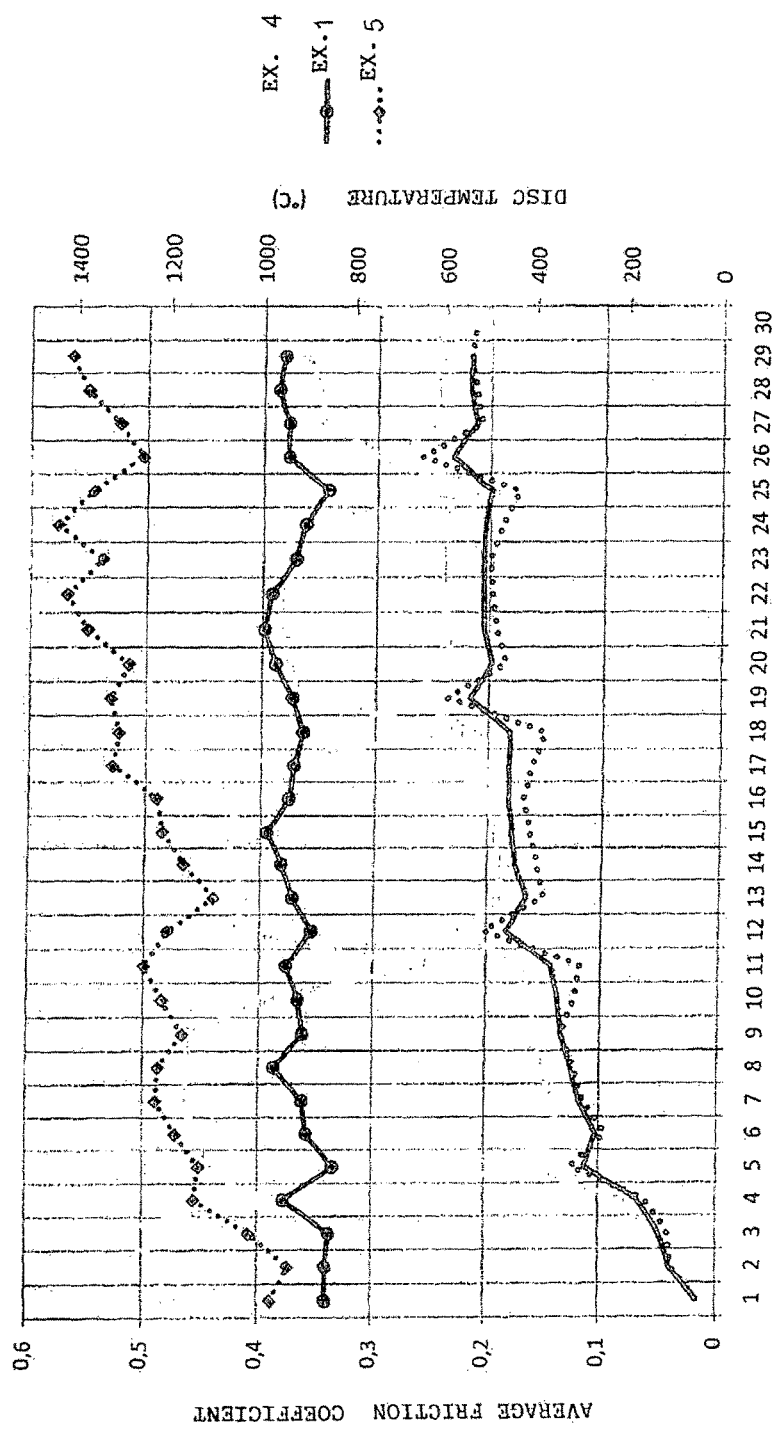

The material for friction components of disc brakes, according to the present invention, comprises between 1% and 8% by weight (wt %) of at least one preceramic resin.

Such a percentage is preferably between 2% and 6%. Optimal results, with the materials given as examples, are obtained with an amount of preceramic resin of about 2% by weight.

Some example of preceramic resins able to be used in the present invention are: polysilanes, polycarbosilanes, polysilazanes and polysiloxanes.

Such a preceramic resin is preferably a silicone resin, even more preferably a siloxane resin. In the preferred embodiment it is a polysilsesquioxane resin.

The material for friction components according to the present invention also comprises between 2% and 10% by weight of at least one organic resin.

Such a percentage is preferably between 4% and 8%. Optimal results are obtained with 7% by weight of organic resin.

As will be seen from the examples, the total amount of preceramic resin and organic resin is preferably less than or equal to 12% by weight.

The organic resin may be selected from: phenolic resins, acrylic resins, epoxy resins.

In accordance with the preferred embodiment of the invention, it is preferably a phenolic resin.

The material for friction components also comprises, in a known way, catalysts, abrasives, metals, damping agents and/or lubricants.

In particular, the catalyst is comprised in the mixture in an amount less than or equal to 2% by weight; the abrasive is between 10% and 30% by weight; the metals are in an amount less than or equal to 60%; the damping agents are in an amount less than or equal to 10%; and the lubricants are in an amount less than or equal to 50%.

The damping agent is used to improve comfort and it preferably comprises planar silicates.

The friction material according to the present invention may be used to produce friction components intended to cooperate tribologically both with brake discs made from composite ceramic material (CCM), and with brake discs made from grey cast iron.

A friction component according to the present invention is preferably a pad.

It has a known geometry, i.e. it is not necessary to make particular structural modifications to the geometry of the pad according to the invention.

A disc brake according to the present invention comprises at least two pads and a caliper for a disc brake of the known type. Such a caliper comprises thrusting means to clamp the pads against a brake band of a brake disc.

The geometries of the pads and of the caliper, being of the known type, will not be described any further.

Preferred examples of processes for producing a material of components of disc brakes, according to the present invention, will now be described.

A preferred process of the invention comprises to provide between 1% and 8% by weight of at least one preceramic resin and between 2% and 10% by weight of at least one organic resin.

They are preferably in powder form.

In a subsequent step, it is provided to mix at least one of the two resins, preferably the preceramic one, with a catalyst. Such a catalyst comprises Zincacetylacetonatehydrate Zn(C5H7O2)2 xH2O.

Thereafter the preceramic resin and the organic resin are mixed together.

The mixture thus obtained is added with the abrasive agent, the lubricant, the metal and/or the damping agent.

The latter has a damping function, is used to improve comfort, and preferably comprises planar silicates.

Then follows a step of moulding and polymerising the mixture so as to obtain a semifinished product.

The moulding takes place through pressure moulding with a pressure of about 150-600 kg/cm².

Thereafter it is possible to carry out a firing step at temperatures that are not high, for example at about 300° C.

In accordance with a first variant of the process of the invention, the preceramic resin, in powder form, is granulated, preferably together with abrasives, lubricants, metals, dampers and a liquid adjuvant, preferably water. The particles that form following such a step are left to dry, preferably at room temperature, and then pyrolysed.

The pyrolysis preferably takes place in an inert atmosphere, for example in nitrogen, at about 500° C. in a pyrolysis furnace.

The product thus obtained is mixed with the organic resin:

Preferably, thereafter it is added to again with one or more from: abrasives, lubricants, metals, dampers.

The mixture is then hot moulded and polymerised. Thereafter it is possible to carry out a firing step at a relatively low temperature, for example about 300° C.

In this way, a structure is obtained made up of an organic matrix in which particles of ceramic material are incorporated.

In accordance with a second variant, the process of the invention comprises providing the preceramic resin in liquid form and the organic resin in powder. Such a variant provides moulding and polymerising the organic resin so as to obtain an organic semifinished product.

Thereafter, the organic semifinished product is heat treated at about 300° C. Such heat treatment preferably comprises a firing step in ambient atmosphere.

Alternatively, the treatment takes place in modified atmosphere, in particular in nitrogen at about 500° C.

Thereafter, the preceramic resin in liquid form, combined with optional additives, is allowed to penetrate in the organic semifinished product so as to obtain a hybrid semifinished product that is then pyrolysed.

Said step is preferably carried out in a vacuum to promote the penetration of the preceramic resin in the porosities of the semifinished product.

EXAMPLES

Example 1

6% by weight of polysilsesquioxane resin, added with catalyst, is mixed with 4% by weight of phenolic resin.

Such a mixture is added to with 24% by weight of abrasive agent, 40% by weight of metal, 21% by weight of lubricant and 5% by weight of damping agent.

Example 2

2% by weight of polysilsesquioxane resin, added with catalyst, is mixed with 7% by weight of phenolic resin.

Such a mixture is added to with 24% by weight of abrasive agent, 41% by weight of metal, 21% by weight of lubricant and 5% by weight of damping agent.

Example 3

4% by weight of polysilsesquioxane resin, added with catalyst; is mixed with 6% by weight of phenolic resin.

Such a mixture is added to with 24% by weight of abrasive agent, 40% by weight of metal, 21% by weight of lubricant and 5% by weight of damping agent.

Example 4 (Comparative)

9% by weight of phenolic resin was added to with 24% by weight of abrasive agent, 41% by weight of metal, 21% by weight of lubricant and 5% by weight of damping agent.

Example 5 (Comparative)

9% by weight of polysilsesquioxane resin, added with catalyst, is mixed with 35% by weight of abrasive agent, 34% by weight of metal and 22% by weight of lubricant.

With each of the five materials obtained, pads of known geometry were made.

The pads obtained in the aforementioned examples 2u were tested through simulation of real braking on a chassis dynamometer reproducing the same inertia of a road vehicle.

The top part of the graph of FIG. 1 shows the progression of the average friction coefficients of the pads according to the first embodiment of the invention (example 1) and according to the two materials of the prior art given, respectively, in example 4 and in example 5, as the number of braking episodes increases, in normal operation.

As it can be seen from such a graph, the material according to the invention maintains a substantially constant average friction coefficient as the number of braking episodes increases. This demonstrates that is maintains good mechanical characteristics. Moreover, the material of the invention does not have the negative peaks of the organic material and therefore there are no sudden decreases in braking efficiency.

In the bottom part of the graph of FIG. 1, it can be seen how the temperature of the disc associated with the pads themselves varies, as the number of braking episodes increases. The temperature of the disc with pads made from material of the invention is lower than the temperature of the disc with pads of organic material (example 4), with obvious mechanical advantages.

From such a FIG. 1 it can thus be seen how the friction coefficient of the pads made with the material according to the invention remains high even at high temperatures.

Figure 2:
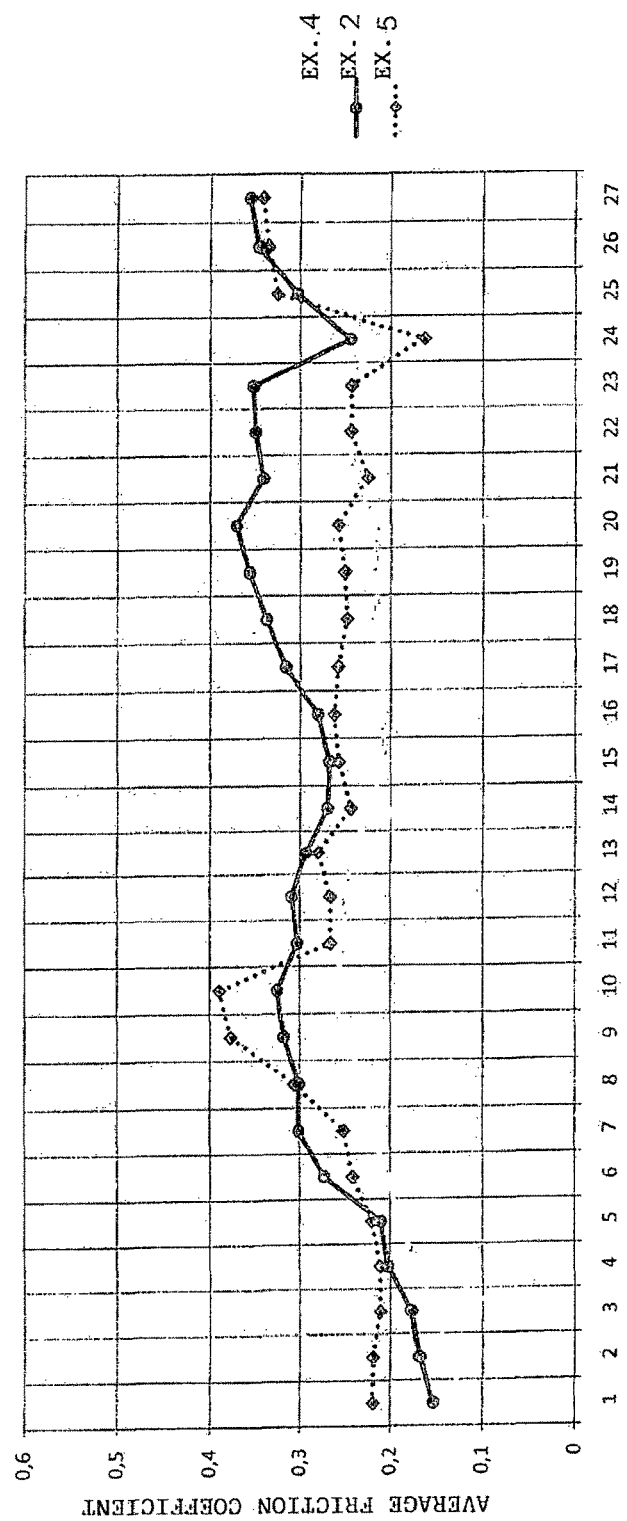
FIG. 2 is a diagram showing the progression of the average friction coefficient of a friction component made from a material according to a second embodiment of the present invention, a known organic material and a known ceramic material, as the number of braking episodes increases, in the running in step.

The graph of FIG. 2 shows the progressions of the average friction coefficients of the pads according to the second embodiment of the invention (example 2), i.e. the particularly preferred embodiment, and according to the two materials of the prior art given, respectively, in example 4 and in example 5, as the number of braking episodes increases, during a running in step. As it is well known, the running in step is a delicate step in which it is more difficult to ensure a constantly high friction coefficient.

As it can be seen from such a graph, the material according to the invention maintains a substantially constant and high average friction coefficient as the number of braking episodes increases, even during running in. Such an average friction coefficient is also on average greater than the friction coefficient of organic material. Therefore, the braking efficiency of pads made with the material of the invention is greater than the braking efficiency of pads made from known organic material (example 4).

Figure 3:
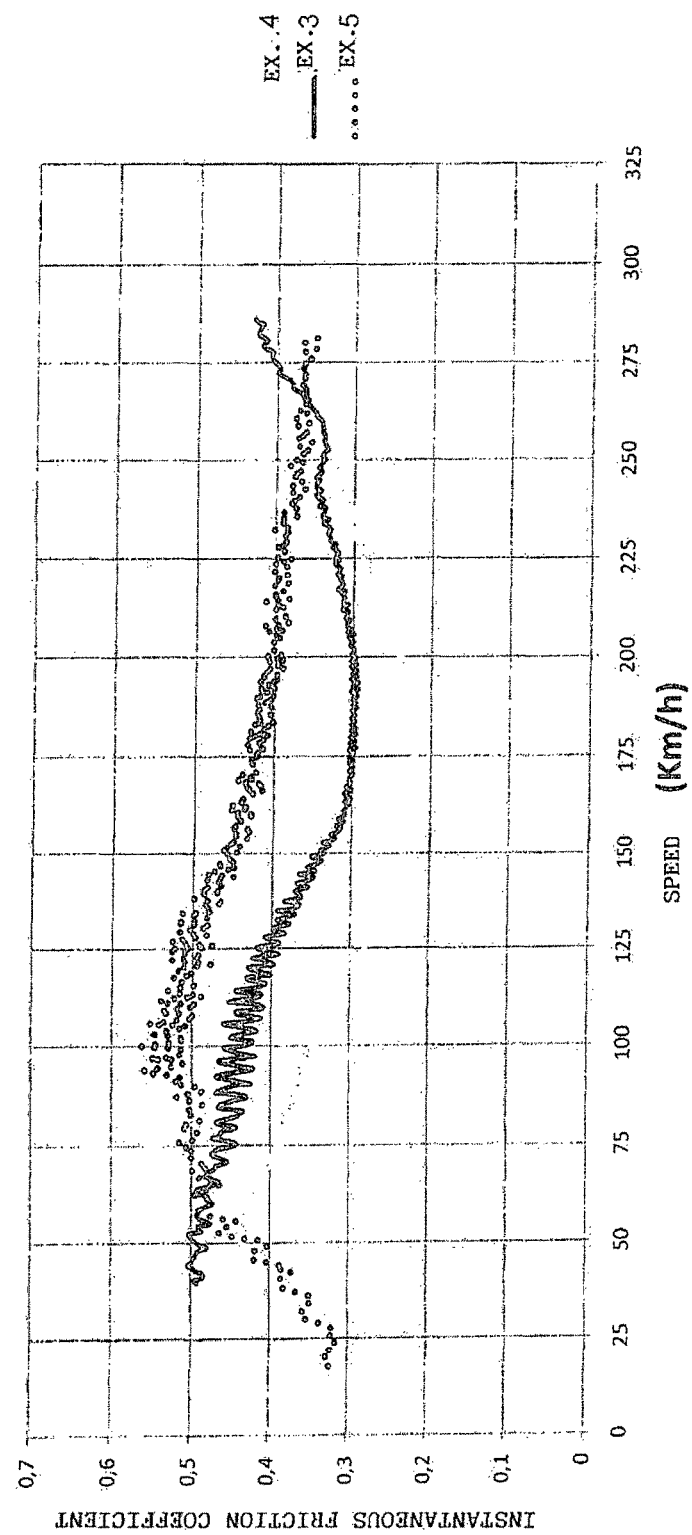
FIG. 3 is a diagram showing the progression of the instantaneous friction coefficient of a friction component of a material according to a third embodiment of the present invention, of a known ceramic material and of a known organic material, during braking.

The graph of FIG. 3 gives the progression of the instantaneous friction coefficients of the pads according to the third embodiment of the invention (example 3) and according to the two materials of the prior art given, respectively, in example 4 and in example 5, during braking.

As it can be seen from such a graph, the material according to the invention maintains a substantially constant instantaneous friction coefficient during braking, and in any case greater than known organic material (example 4).

The pads obtained with the aforementioned five materials were also subjected to comfort tests, i.e. noisiness tests.

Whereas the pads of example 5, i.e. the ceramic ones, proved to be noisy, the remaining four pads gave good results, i.e. they proved to be sufficiently noiseless and comfortable.

From the results of the tests it can be seen that the material of friction components for disc brakes according to the present invention has a substantially constant average friction coefficient, similarly to the case of ceramic material.

In other words, the performance of the material of the invention, in terms of braking efficiency, is as good as the performance of ceramic materials.

On the other hand, organic material is subject to rapid degradation of the friction coefficient, i.e. it does not withstand high temperatures, quickly losing braking efficiency.

Comfort tests have shown that the performance of the materials according to the invention is as good as that of organic materials, i.e. better than ceramic materials.

In conclusion, the materials for friction components according to the invention, and therefore the friction components obtained therewith, have good mechanical characteristics and excellent comfort.

Of course, it is possible to vary the composition of the material of the invention, within the indicated ranges, according to the specific requirements. In other words, if particularly high mechanical characteristics were required, a percentage of preceramic resin close to 8% could be used. Similarly, if the particular application were to require good characteristics in terms of comfort, a percentage of organic resin close to 10% could be used.

In the above description and in the following claims, all of the numerical magnitudes indicating amounts, parameters, percentages, and so on should be taken to be preceded in all circumstances by the term "about" unless indicated otherwise. Moreover, all of the ranges of numerical magnitudes include all of the possible combinations of maximum and minimum numerical values and all of the possible intermediate ranges, as well as those specifically indicated in the text.

Of course, the man skilled in the art, in order to satisfy contingent and specific requirements, can bring further modifications and variants, all of which are in any case covered by the scope of protection of the present invention, to the material for friction components, to the friction components, to the disc brakes and to the process for producing the material for friction components according to the present invention.

We claim:

1. A material for friction components of disc brakes consisting of:
    a mixture between 1% and 8% by weight of a preceramic silicone resin and between 2% and 10% by weight of an organic resin selected from a phenolic resin, an acrylic resin, and an epoxy resin; and
    at least one catalyst, at least one abrasive agent, at least one lubricant, at least one metal, and at least one damping agent.

2. The material for friction components according to claim 1, wherein a total amount of preceramic silicone resin and organic resin is less than or equal to 12% by weight.

3. The material for friction components according to claim 1, comprising between 2% and 6% by weight of preceramic silicone resin and between 4% and 8% by weight of organic resin.

4. The material for friction components according to claim 1, comprising 2% by weight of preceramic silicone resin and 7% by weight of organic resin.

5. The material for friction components according to claim 1, wherein said preceramic silicone resin comprises at least one silicone resin.

6. The material for friction components according to claim 5, wherein said silicone resin is a siloxane resin.

7. The material for friction components according to claim 6, wherein said siloxane resin is a polysilsesquioxane resin.

8. The material for friction components according to claim 1, wherein said organic resin is a phenolic resin.

9. A friction component for disc brakes comprising a material consisting of:
    a mixture between 1% and 8% by weight of a preceramic silicone resin and between 2% and 10% by weight of an organic resin selected from a phenolic resin, an acrylic resin, and an epoxy resin; and
    at least one catalyst, at least one abrasive agent, at least one lubricant, at least one metal, and at least one damping agent.

10. The friction component according to claim 9, comprising at least one pad for a disc brakes.

11. A disc brake comprising at least two pads according to claim 10 and a caliper for a disc brake comprising thrusting means suitable for clamping said at least two pads against a braking face of a brake disc.

12. A process for producing a material for friction components of disc brakes comprising the following steps:
    providing between 1% and 8% by weight of a preceramic silicone resin;
    providing between 2% and 10% by weight of an organic resin selected from a phenolic resin, an acrylic resin, and an epoxy resin;
    mixing the preceramic silicone resin and the organic resin;
    forming a mixture consisting of: the preceramic silicone resin, the organic resin, at least one catalyst, at least one abrasive agent, at least one lubricant, at least one metal, and at least one damping agent;
    moulding and polymerising the mixture so as to obtain a semifinished product; and
    firing the semifinished product.

13. The process for producing a material for friction components of disc brakes according to claim 12, wherein a total amount of preceramic silicone resin and organic resin is less than or equal to 12% by weight.

14. The process for producing a material for friction components of disc brakes according to claim 12, wherein the preceramic silicone resin is between 2% and 6% by weight, and the organic resin is between 4% and 8% by weight.

15. The process for producing a material for friction components of disc brakes according to claim 12, wherein the preceramic silicone resin is 2% by weight and the organic resin is 7% by weight.

16. The process for producing a material for friction components of disc brakes according to claim 12, wherein the preceramic silicone resin comprises at least one silicone resin.

17. The process for producing a material for friction components of disc brakes according to claim 12, wherein the preceramic silicone resin comprises a siloxane resin.

18. The process for producing a material for friction components of disc brakes of claim 12, wherein the preceramic silicone resin comprises a polysilsesquioxane resin.

19. The process for producing a material for friction components of disc brakes of claim 12, wherein the organic resin is a phenolic resin.

* * * * *